United States Patent
Stites et al.

(10) Patent No.: US 10,540,507 B2
(45) Date of Patent: Jan. 21, 2020

(54) VERIFIED DEVICE IDENTITY PROVIDING CONTEXT TO APPLICATION

(71) Applicant: Cisco Technology, Inc., San Jose, CA (US)

(72) Inventors: Steven Richard Stites, Austin, TX (US); Morteza Ansari, Newark, CA (US); Syam Sundar V Appala, Santa Clara, CA (US); Prashanth Patil, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 181 days.

(21) Appl. No.: 15/597,332

(22) Filed: May 17, 2017

(65) Prior Publication Data

US 2018/0337920 A1    Nov. 22, 2018

(51) Int. Cl.
*G06F 21/60* (2013.01)
*G06F 16/90* (2019.01)

(52) U.S. Cl.
CPC ............ *G06F 21/606* (2013.01); *G06F 16/90* (2019.01); *G06F 2221/2149* (2013.01)

(58) Field of Classification Search
CPC ........ G06F 21/606; G06F 21/44; G06F 21/73; G06F 16/90; H04L 63/0272; H04L 63/0815; H04W 12/06
USPC .......................................................... 726/6
See application file for complete search history.

(56) References Cited

U.S. PATENT DOCUMENTS

| | | | |
|---|---|---|---|
| 7,194,761 B1 * | 3/2007 | Champagne | G06F 21/31 709/232 |
| 8,949,938 B2 | 2/2015 | Sowatskey et al. | |
| 9,152,781 B2 | 10/2015 | Sowatskey | |
| 2003/0105849 A1 * | 6/2003 | Iwamoto | G06F 21/604 709/223 |
| 2003/0167336 A1 * | 9/2003 | Iwamoto | G06F 21/604 709/229 |
| 2013/0007867 A1 | 1/2013 | Sowatskey et al. | |

(Continued)

OTHER PUBLICATIONS

"Empowering Mobile Users to Work Anywhere, an Any Device", White Paper, F5 Networks, Inc., WP-F5-APM-SSL-VPN-39952 0113, 8 pages.

(Continued)

*Primary Examiner* — Michael S McNally
(74) *Attorney, Agent, or Firm* — Edell, Shapiro & Finnan, LLC

(57) ABSTRACT

A device obtains access to an application resource from a remote application server based on an authenticated device identifier. The device sends a request to access the application resource provided by the remote application server. The device receives a first message from the remote application server directing the device to send an authentication message to a device identity server. The authentication message requests an authenticated device identity for the device. The device attaches metadata associated with the device to the authentication message and sends the authentication message with the attached metadata to the device identity server. The device receives the authenticated device identity from the device identity server and sends the authenticated device identity to the remote application. The device obtains access to the application resource from the remote application server based on the authenticated device identity.

20 Claims, 5 Drawing Sheets

(56) References Cited

U.S. PATENT DOCUMENTS

| | | | |
|---|---|---|---|
| 2014/0068746 A1* | 3/2014 | Gonzalez Martinez | ...................... H04L 63/0884 726/9 |
| 2014/0208384 A1* | 7/2014 | Youssefian | .......... H04L 63/0884 726/3 |
| 2014/0279477 A1* | 9/2014 | Sheets | .................... G06Q 40/02 705/41 |
| 2014/0359741 A1* | 12/2014 | Kistner | ............... H04L 63/0823 726/7 |
| 2015/0089568 A1* | 3/2015 | Sprague | .............. H04L 63/0876 726/1 |
| 2016/0087970 A1* | 3/2016 | Kahol | ................. H04L 63/0281 726/8 |
| 2016/0344736 A1 | 11/2016 | Khait et al. | |
| 2017/0099148 A1* | 4/2017 | Ochmanski | ........... H04L 9/3247 |
| 2017/0171200 A1* | 6/2017 | Bao | .................... H04L 63/0884 |

OTHER PUBLICATIONS

"SaaS Security Best Practices: Minimizing Risk in the Cloud", IT©Intel White Paper, Intel Corporation, Aug. 2015, 0815/ERAI/KC/PDF, 11 pages.

"Pulse Cloud Secure—Secure Access for the Cloud and Data Center", PulseSecure, Version OS 022416, https://www.pulsesecure.net/connect-secure/, 2 pages.

* cited by examiner

VERIFIED DEVICE IDENTITY PROVIDING CONTEXT TO APPLICATION

TECHNICAL FIELD

The present disclosure relates to securely providing access to remote applications.

BACKGROUND

Federation of user identity provides a mechanism for a remote provider to authenticate users across multiple computer systems. A number of standards, such as Security Assertion Markup Language (SAML), OpenID Connect, Web Services (WS)-Federation, provide consistent interfaces to convey the federated user identity across the multiple computer systems. One use of a federated user identity allows an authenticated user access to Software-as-a-Service (SaaS) in which an application is remotely hosted and maintained for the authenticated user.

DESCRIPTION OF EXAMPLE EMBODIMENTS

Overview

In one embodiment, a computer-implemented method is provided for a device to obtain access to an application resource from a remote application server based on an authenticated device identifier. The method includes sending a request to access an application resource provided by a remote application server. The device receives a first message from the remote application server. The first message directs the device to send a first authentication message to a device identity server requesting an authenticated device identity for the device. The device attaches metadata associated with the device to the first authentication message to generate a second authentication message. The device sends the second authentication message to the device identity server and receives the authenticated device identity in return. The device sends the authenticated device identity to the remote application. The device obtains access to the application resource from the remote application server based on the authenticated device identity.

DETAILED DESCRIPTION

Proliferation of SaaS applications in enterprises and migration of legacy applications from enterprise data centers to private or public clouds may require users to access applications remotely from systems with varying security access and requirements. Within the enterprise environment, network segmentation along with device management/posture assessment may be used to provide additional security and policy for access to applications. As applications migrate to the cloud or are replaced by commercially available SaaS, the systems hosting the remote service may not have the visibility into the device context to enforce policies based on local devices. Contextual elements, such as device posture, location, and compliance, may be used by the remote service when making authorization decisions about which permissions a user may have at any given time, depending on the device they are using to access the service. As used herein, a device may refer to any type of device with computing resources. For instance, a device may be a consumer device such as a telephone associated with a user, an Internet of Things (IoT) device such as a connected home appliance or television, a network or security appliance such as a router or firewall (virtual or physical), or a computing unit such as a virtual machine or container.

Figure 1:
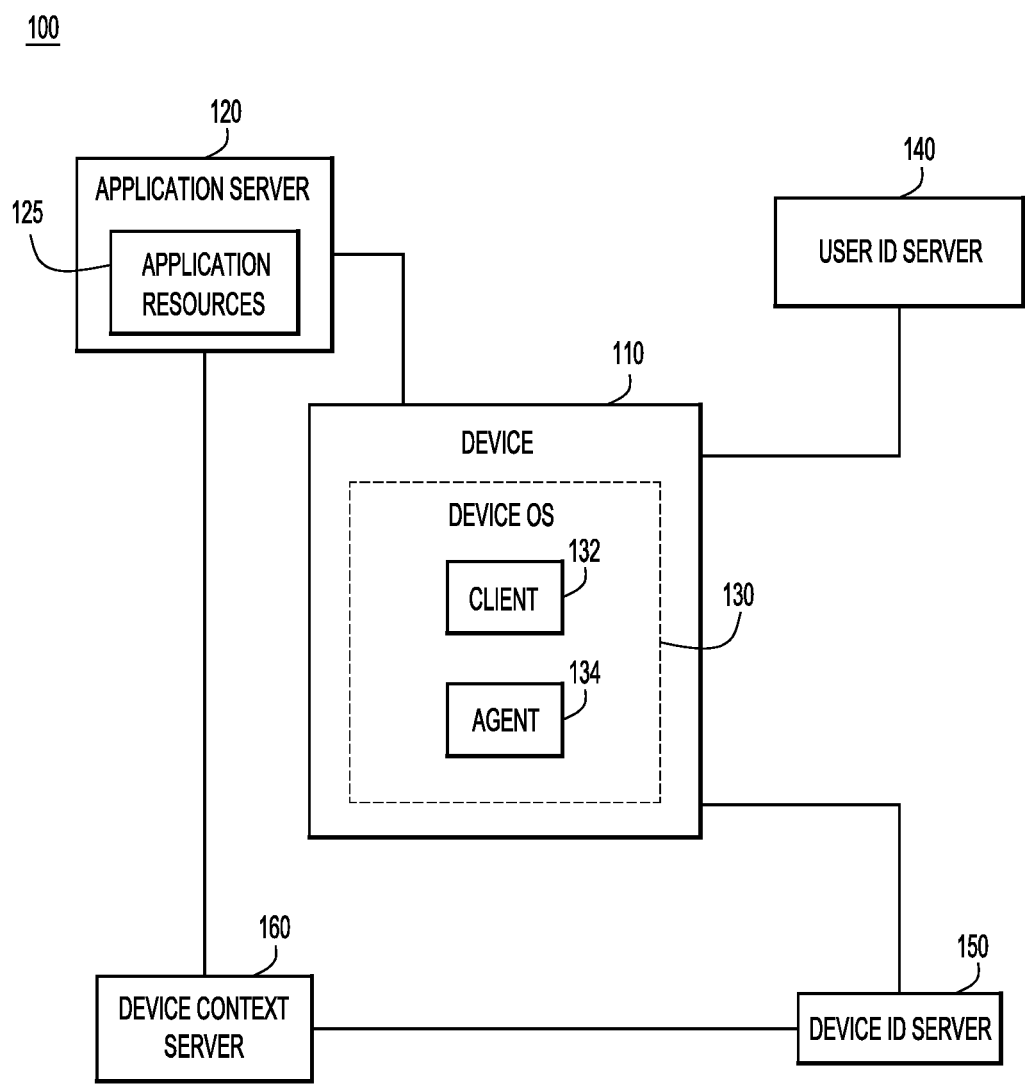
FIG. 1 is a simplified block diagram of a system to provide federated device identity access to a remotely provided application, according to an example embodiment.

Referring now to FIG. 1, a simplified block diagram of a federated identity system 100 to provide access to a remote application resource is shown. A device 110 requests that a remote application server 120 provide access to an application resource 125 that is hosted on the application server 120. The device 110 includes an operation system 130 with a local client 132 (e.g., a web browser) for accessing the remote application resource 125. In one example, the application server is a protected resource server that controls access to the application resource 125. The application resource 125 may include an application that is hosted on the application server 120. Alternatively, the application resource 125 may include application data that the local client 132 requires to run an application on the device 110. The operating system 130 also includes an agent 134 for processing requests for an authenticated device identity. In one example, the agent 134 may be a process in the kernel space of the operating system 130.

If the application server 120 requires a user authentication and assertion, the device 110 connects to a user identity server 140 to authenticate the identity of the user. The user identity server 140 provides a standardized (e.g., SAML) authenticated user identity assertion for the device 110 to present to the application server 120 in order to gain access to the application resource 125. If the application server 120 requires a device authentication and assertion, the device connects to a device identity server 150 to authenticate the identity of the device 110. The device identity server 150 provides an authenticated device identity assertion for the device 110 to present to the application server 120 in order to gain access to the application resource 125. In one example, the device identity server 150 is essentially a cloud-based device identity provider in a SAML model of software licensing. The device identity server 150 may also connect to a device context server 160 that verifies the context of the device 110. The application server 120 may also connect to the device context server 160 to verify the context of the device 110. In one example the context server 160 provides a Representational State Transfer (REST) Application Programming Interface (API) through which the device identity server 150 or the application server 120 can retrieve context information about device 110.

In one example, the federated identity system 100 enables the application server 120 to provide the application resource 125 (e.g., a cloud deployed application, or protected application data) while identifying the device 110 and obtaining its context to support richer policies at the application layer. The user attempts to access an enterprise application from the device 110. A user identity federation enables the user identity server 140 to provide an assertion of the user identity to the application server 120 via the device 110. A device identity federation enables the device identity server 150 to provide a trusted assertion about the identity of the device 110. The application server 120 may use the device identity assertion to access the context server 160 to obtain device context on an ongoing basis.

In another example, the device identity server 150 may determine the authenticated device identity for different devices based on different authentication mechanisms, depending on the capabilities of the devices and the configuration/polices of the device identity server 150. The device identity server 150 may generate different levels of authenticated device identities based on the quality of the authentication mechanism supported by each device. The application server 120 may grant varying levels of access to the application resource 125 based on the different levels of authenticated device identity according to security policies. Additionally, to provide fine grain authorization, the application server 120 may access contextual information from the context server 160 about the device 110. For instance, the application server 120 may only grant access to the application resource 125 if the context server 160 indicates that the device 110 (e.g., a smart phone) is configured according to a particular security policy (e.g., with remote wipe capability or six digit password). In some cases, the authenticated device identifier is sufficient to grant access to the application resource 125, but in other cases, the application server 120 may require access to the state/context of the device 110 before providing access to the application resource 125.

Figure 2:
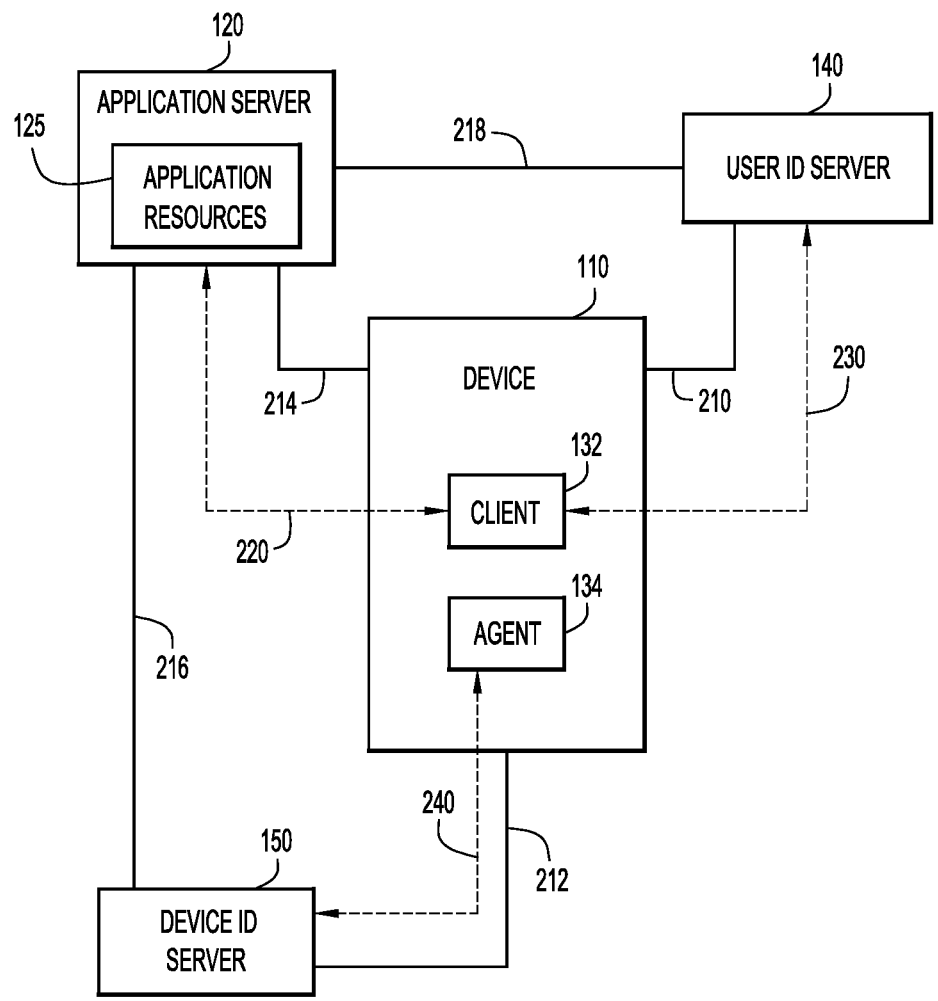
FIG. 2 is a simplified block diagram showing trust boundaries established in the federated device identity system, according to an example embodiment.

Referring now to FIG. 2, a simplified block diagram shows how different trust relationships are established in gathering the federated user identity and the federated device identity. A first trust relationship 210 between the device 110 and the user identity server 140 is established to secure the federated user identity, and a second trust relationship 212 between the device 110 and the device identity server 150 is established to secure the federated device identity. A trust relationship 214 is established to secure the communications between the device 110 and the application server 120. Additional trust relationships 216 and 218, between the application server 120 and the device identity server 150 and the user identity server 140, respectively, may be established to allow the application server 120 to accept authenticated assertions from either identity server.

In one example, the trust relationships 210, 212, 214, 216, and 218 are established as Secure Sockets Layer (SSL) tunnels. For instance, the trust relationship 210 may be an SSL tunnel established by the client 132 to communicate with the application server 120. The trust relationship 212 may be an SSL tunnel established by the agent 134 to communicate with the device identity server 150. When the user requests access to the application resource 125 through the client 132, the application server 120 may redirect the client 132 to request an authenticated user identity from the user identity server 140. The application server 120 may also redirect the client 132 to request an authenticated device identifier from the device identifier 150.

The request for an authenticated user identity may be redirected by the client 132 without breaking the trust relationships 210, 214, and 218. Typical federation techniques enable the application server 120 to generate a request for the authenticated user identity and send a redirect message including the request. The client 132 processes the redirect message and sends the request without changes to the user identity server 140. Similarly, the user identity server 140 replies to the client 132 with a redirect message including the authenticated user identity. The client 132 processes the redirect message and sends the authenticated user identity to the application server 120 without changes.

In contrast, the request from the application server 120 for an authenticated device identity requires the device 110 to add device specific metadata to the request. As any modification of messages under the trust relationship 214 would trigger alarms in the trust relationship 214, the device 110 establishes the trust relationship 212 to forward the modified request for the authenticated device identity. In other words, the request for the authenticated device identity being modified at the device 110 requires the agent 134 in the device 110 to establish a connection to the device identity server 150 under the different trust relationship 212.

Figure 3:
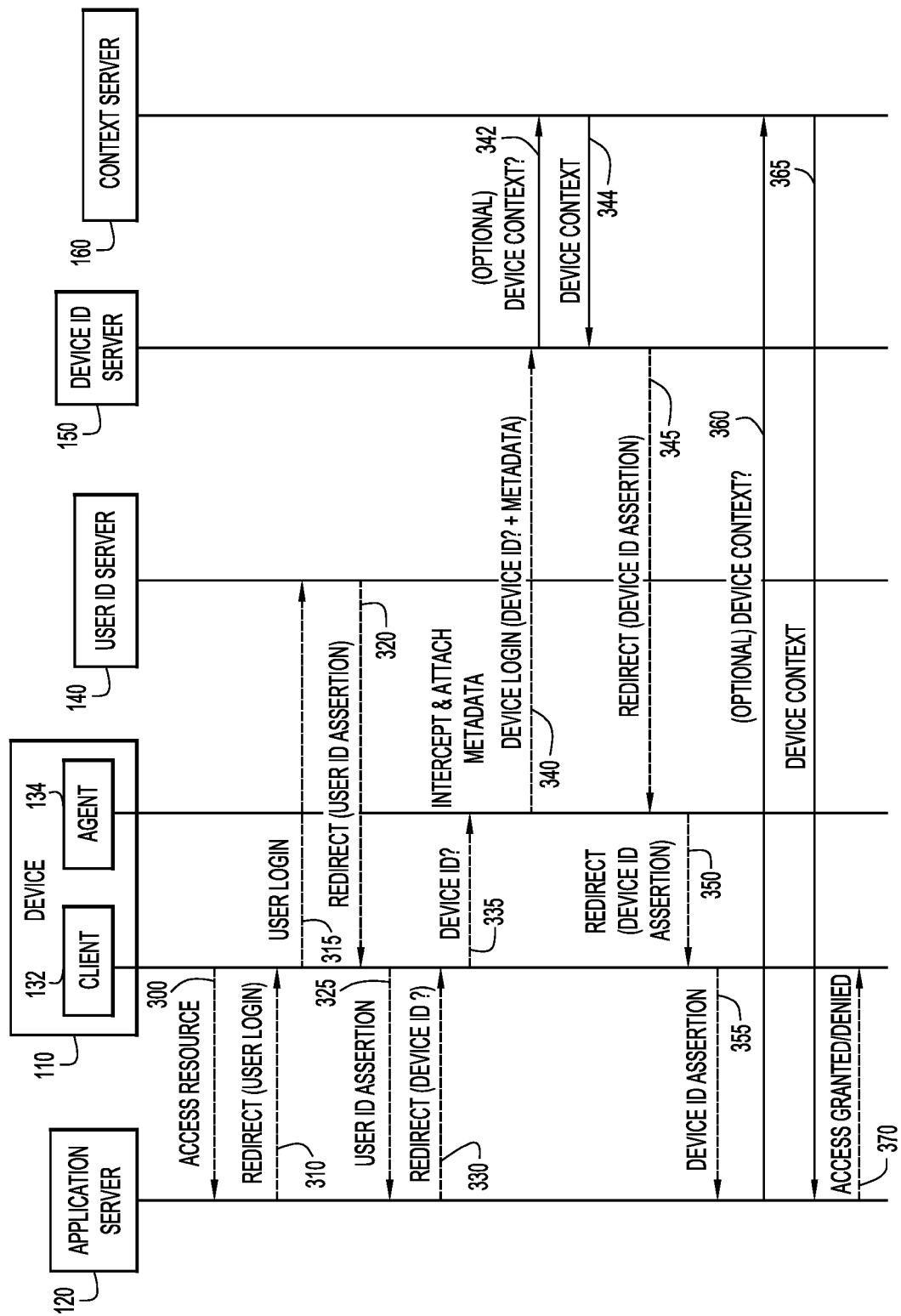
FIG. 3 is a sequence diagram illustrating messages obtaining access to a remotely hosted application for a user with an authenticated user identity using a device with an authenticated device identity, according to an example embodiment.

Referring now to FIG. 3, a ladder diagram illustrates an example sequence of messages providing access to a remotely hosted application for a device 110. Initially, the user directs the client 132 of the device 110 to send a request message 300 to the application server 120. The request message 300 requests access to an application resource stored on the application server 120. The application server 120 responds with a first redirect message 310 that directs the client 132 to log into the user identity server 140. The redirect message 310 may also include the network address of the user identity server 140. The client 132 receives the redirect message 310 and forwards the included user login request 315 unchanged to the user identity server 140.

After processing the user login request 315 and authenticating the user (e.g., through a user name and password), the user identity server 140 sends a redirect message 320 to the client 132. In one example, the user login request 315 may trigger a multi-round complex cryptographic challenge or Public Key Infrastructure (PKI)-based exchange. The redirect message 320 includes an authenticated user identity 325, which is forwarded to the application server 120. In one example, the user identity server 140 (i.e., a SAML identity provider) provides the authenticated user identity 325 as a SAML identity assertion for the user of the device 110 (i.e., a SAML principal) to show the application server 120 (i.e., a SAML service provider).

Once the application server 120 has received the user identity assertion 325 of an authorized user, the application server 120 sends a redirect message 330 to the client 132. The redirect message 330 includes a request 335 for an authenticated device identity, and may also include the network address of the device identity server 150. The client 132 forwards the request 335 for an authenticated device identity toward the device identity server 150, but the agent 134 intercepts the request 335. The agent 134 attaches metadata associated with the device 110 to the request 335 to form a new request 340 for an authenticated device identity, which the agent 134 sends to the device identity server 150. In one example, the agent 134 establishes a separate SSL tunnel to the device identity server 150 and sends the request 340 through the separate SSL tunnel. In another example, the request 340 may trigger a multi-round complex cryptographic challenge or PKI-based exchange to authenticate the device identity.

On receiving the request 340, the device identity server 150 authenticates the device 110 (e.g., by validating the metadata) and generates a secure assertion with the proper level of trust indicated by a stored policy. The device identity provider 150 may also send a request 342 to a context server 160 to verify the device context of the device 110. The context server 160 returns information associated with the device context in message 344, which may include an authorization token allowing the application server 120 to obtain context information in the future. In one example, the device context may include posture information, such as network interface configuration and compliance with network security policies.

The device identity server 150 sends a redirect message 345 back to the device 110 including the authenticated device identity and any available device context information. The agent 134 receives the redirect message 345 and forwards it as a redirect message 350 to the client 132. Alternatively, the device identity server 150 may send the redirect message 345 directly to the client 132, without the participation of the agent 134. The client 132 forwards the authenticated device identity to the application server 120 in message 355, providing the application server 120 with the authenticated device identity provided by the device identity server 150.

The application server 120 may request device context information from the context server 160 in message 360. In one example, the message 355 including the authenticated device identity also includes a token authorizing the application server 120 to obtain further device context information on the device 110 from the context server 160. The context server 160 responds with the device context information associated with the device 110 in message 365.

Based on the authenticated user identity provided in message 325, the authenticated device identity provided in message 355, and any device context information provided in messages 355 and/or 365, the application server 120 determines whether to grant or deny access to the application resource requested in the original request message 300. The application server 120 informs the client 132 of the determination in message 370. If the application server 120 determines that the client 132 is granted access to the application resource hosted by the application server 120, the client 132 may access the application resource in subsequent communications that are not shown in FIG. 3.

In one example, the application server 120 may grant a specific level of access to the application resource based on the authenticated user identity and/or the authenticated device identity. For instance, the application server 120 may grant a supervisor user on a desktop computer that is hardwired to a trusted network different access to an application resource than a temporary employee user that is connected to a publicly available wireless network from their smart phone. The application server 120 may store security policies that determine the different levels of access that are associated with different authenticated user identities, different device identities, and/or different device contexts/postures.

In another example, the agent 134 intercepts the Transport Control Protocol (TCP) connection from the client 132, but does not intercept the SSL/HTTPS connection with the application server 120. Leaving the SSL/HTTPS connection intact maintains the trust relationship 210 between the client 132 and the application server 120. After intercepting the TCP message of the request 335, the agent 134 securely tunnels the request 340 to the device identity server 150 while attaching device metadata about the device 110. The content of the metadata may include any information that the device identity server 150 can use to verify the identity of the device 110 with a given level of trust. The metadata may be a self-asserted identifier or a signed assertion from a hardware token in the device 110. If the device identity server 150 does not require any additional metadata to authenticate the device identity of the device 110, then the agent 134 may forward the request 335 without any additional metadata.

The agent 134 may be configured to intercept any TCP traffic directed to the device identity server 150 and attach the device metadata. The device identity server 150 may ignore the metadata if the intercepted and retransmitted message does not require the metadata. For instance, the agent 134 may intercept a TCP message, which is not a request for an authenticated device identity, and append the device metadata before sending it to the device identity server 150. In this case, the device identity server 150 will ignore the device metadata. Alternatively, the agent 134 may be specific to TCP messages directed to the device identity server 150 that are requests for an authenticated device identity, and only attach the device metadata to those requests.

In still another example, the application server 120 may request the authenticated device identity with message 330 before requesting the authenticated user identity with message 310. For instance, the application server 120 may only require an authenticated device identity, and respond to the request message 300 with the redirect message 330 asking for an authenticated device identity. Once the application server receives the authenticated device identity in message 355, the application server 120 may request the authenticated user identity by sending the redirect message 310 to the client 132. Alternatively, the application server 120 may request the authenticated user identity and authenticated device identity concurrently by sending the messages 310 and 330 without waiting for either of the response messages 325 and 355.

Additionally, the application server 120 may not require both an authenticated user identity and an authenticated device identity to determine whether to grant access to the hosted application. For instance, the application server 120 may forgo the authenticated user identity for a device 110 that is not necessarily associated with a specific user (e.g., an IoT device, a firewall, a jet engine, etc.). In other words, the processes and messages exchanged for obtaining an authenticated user identity and obtaining an authenticated device identity are completely separable and distinct events that are not dependent on each other. In one example, the authenticated user identity and the authenticated device identity may be verified independently using different trust models and with different authentication data. This flexibility may be useful in scenarios in which the device identity and trust framework is independent of user identity infrastructure, or in cases in which there is no specific user identity, such as IoT devices, security/networking appliances, and/or virtual machines/containers.

In a further example, the agent 134 may be replaced with a security mechanism that is integrated into the client 132 to handle redirect messages and collect device metadata to validate the device identity with the device identity server 150.

Figure 4:
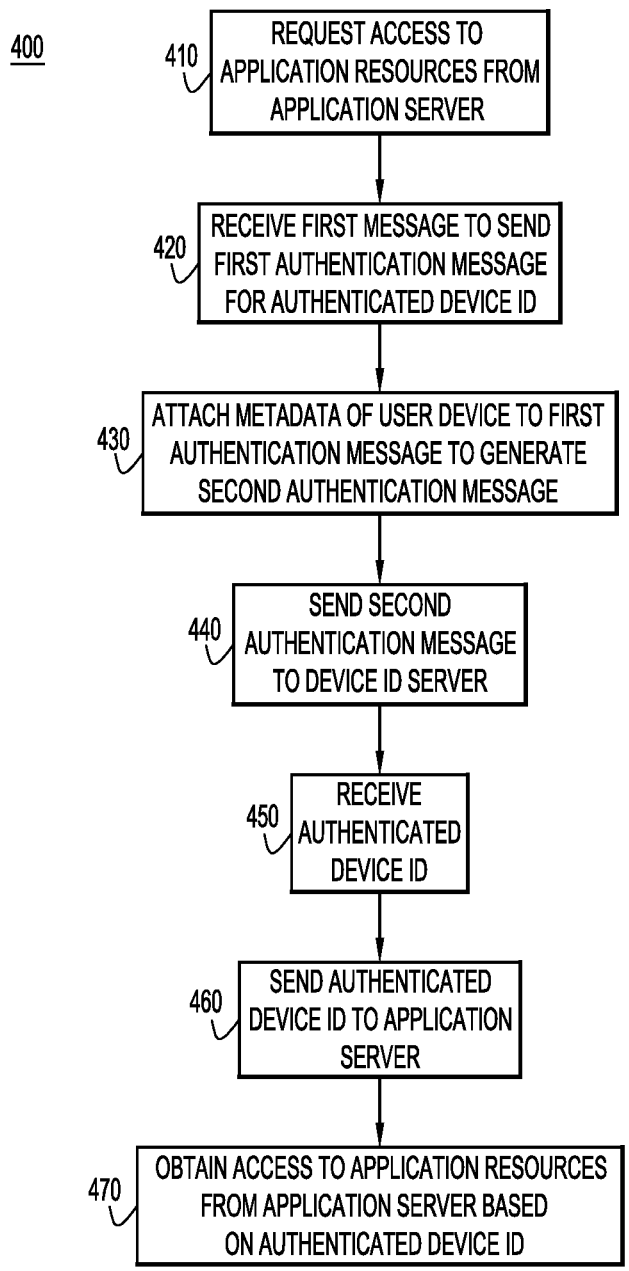
FIG. 4 is a flow chart illustrating the operations performed by a user device in obtaining access to a remote application using an authenticated device identifier, according to an example embodiment.

Referring now to FIG. 4, a flow chart is shown that illustrates operations performed by a computing device (e.g., device 110) in a process 400 for accessing an application resource hosted by a remote application server (e.g., in a SaaS model) using an authenticated device identity. In step 410, the device requests access to an application resource provided by a remote application server. In one example, the application resource includes a cloud-based application that is provided to authorized users on authorized devices. Alternatively, the application resource may include application data required by an application running on the device. In step 420, the device receives a first message from the remote application server. The first message directs the device to request an authenticated device identity for the device by sending a first authentication message to a device identity server. In one example, the first message includes the network address of the device identity server to which the device is directed to send the first authentication message.

In step 430, the device attaches metadata associated with the device to the first authentication message in order to generate a second authentication message. The device sends the second authentication message to the device identity server in step 440. In one example, an agent in the device sends the second authentication message to the device identity server under a different trust relationship than the trust relationship under which communications with the remote application server are sent and received.

In step 450, the device receives the authenticated device identity from the device identity server. In one example, the device may also receive device context/posture information to pass along to the remote application server. In step 460, the device sends the authenticated device identity to the remote application server. In one example, the device may also send any device context/posture information received from the device identity server to the remote application server. In step 470, the device obtains access to the application resource from the remote application server based on the authenticated device identity. In one example, the device may obtain access to the application resource based information on the specific device context/posture provided to the remote application server.

Figure 5:
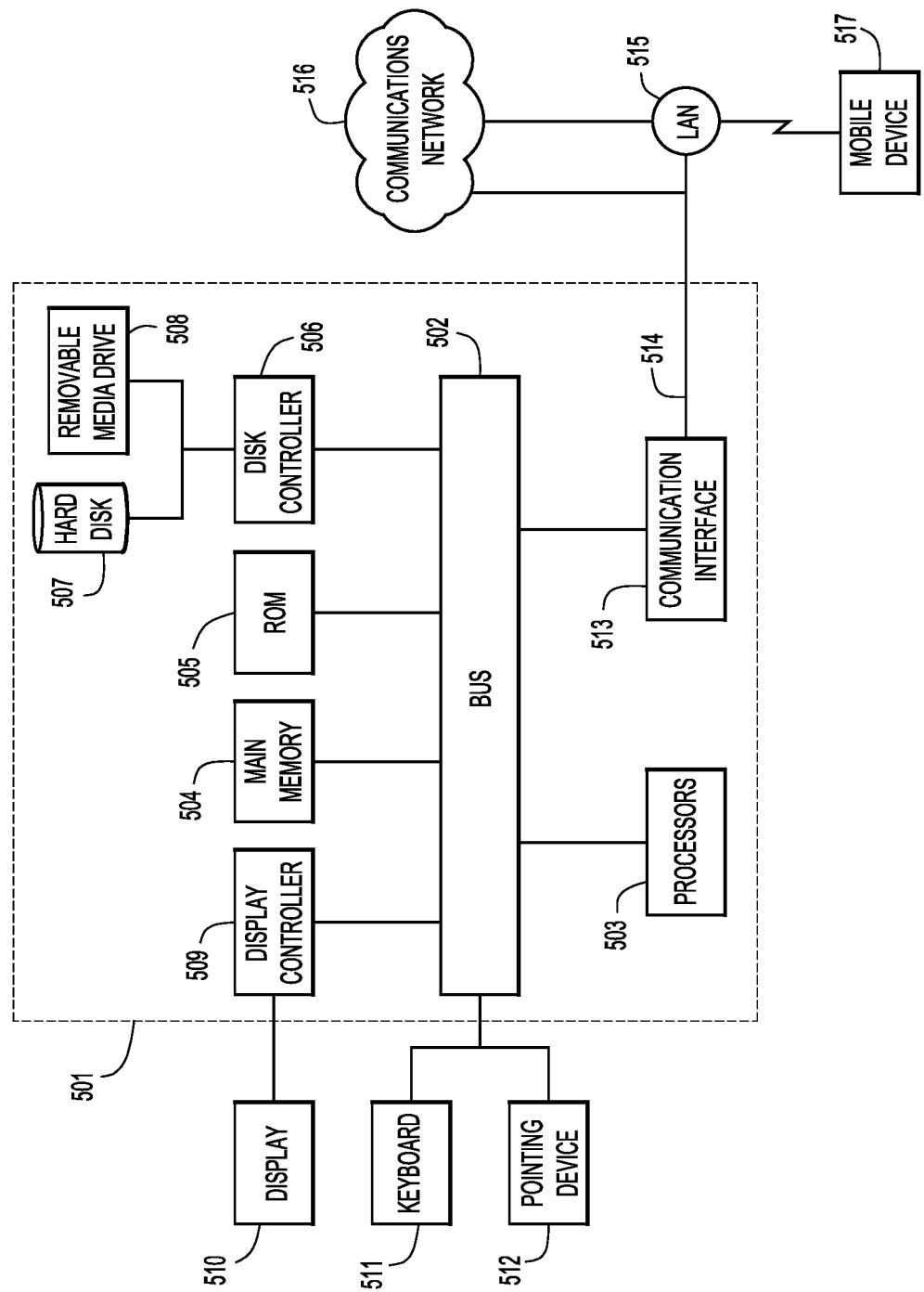
FIG. 5 is a simplified block diagram of a device that may be configured to perform methods presented herein, according to an example embodiment.

Referring now to FIG. 5, an example of a block diagram of a computer system 501 that may be representative of the device 110 in which the embodiments presented may be implemented is shown. The computer system 501 may be programmed to implement a computer based device, such as a device in a federated identity system. The computer system 501 includes a bus 502 or other communication mechanism for communicating information, and a processor 503 coupled with the bus 502 for processing the information. While the figure shows a single block 503 for a processor, it should be understood that the processors 503 may represent a plurality of processing cores, each of which can perform separate processing. The computer system 501 also includes a main memory 504, such as a random access memory (RAM) or other dynamic storage device (e.g., dynamic RAM (DRAM), static RAM (SRAM), and synchronous DRAM (SD RAM)), coupled to the bus 502 for storing information and instructions to be executed by processor 503. In addition, the main memory 504 may be used for storing temporary variables or other intermediate information during the execution of instructions by the processor 503.

The computer system 501 further includes a read only memory (ROM) 505 or other static storage device (e.g., programmable ROM (PROM), erasable PROM (EPROM), and electrically erasable PROM (EEPROM)) coupled to the bus 502 for storing static information and instructions for the processor 503.

The computer system 501 also includes a disk controller 506 coupled to the bus 502 to control one or more storage devices for storing information and instructions, such as a magnetic hard disk 507, and a removable media drive 508 (e.g., floppy disk drive, read-only compact disc drive, read/write compact disc drive, compact disc jukebox, tape drive, and removable magneto-optical drive, solid state drive, etc.). The storage devices may be added to the computer system 501 using an appropriate device interface (e.g., small computer system interface (SCSI), integrated device electronics (IDE), enhanced-IDE (E-IDE), direct memory access (DMA), ultra-DMA, or universal serial bus (USB)).

The computer system 501 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, include types of processing circuitry. The processing circuitry may be located in one device or distributed across multiple devices.

The computer system 501 may also include a display controller 509 coupled to the bus 502 to control a display 510, such as a cathode ray tube (CRT), liquid crystal display (LCD) or light emitting diode (LED) display, for displaying information to a computer user. The computer system 501 includes input devices, such as a keyboard 511 and a pointing device 512, for interacting with a computer user and providing information to the processor 503. The pointing device 512, for example, may be a mouse, a trackball, track pad, touch screen, or a pointing stick for communicating direction information and command selections to the processor 503 and for controlling cursor movement on the display 510. In addition, a printer may provide printed listings of data stored and/or generated by the computer system 501.

The computer system 501 performs a portion or all of the processing steps of the operations presented herein in response to the processor 503 executing one or more sequences of one or more instructions contained in a memory, such as the main memory 504. Such instructions may be read into the main memory 504 from another computer readable storage medium, such as a hard disk 507 or a removable media drive 508. One or more processors in a multi-processing arrangement may also be employed to execute the sequences of instructions contained in main memory 504. In alternative embodiments, hard-wired circuitry may be used in place of or in combination with software instructions. Thus, embodiments are not limited to any specific combination of hardware circuitry and software.

As stated above, the computer system 501 includes at least one computer readable storage medium or memory for holding instructions programmed according to the embodiments presented, for containing data structures, tables, records, or other data described herein. Examples of computer readable storage media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM, DVD), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 501, for driving a device or devices for implementing the operations presented herein, and for enabling the computer system 501 to interact with a human user (e.g., a network administrator). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 501 also includes a communication interface 513 coupled to the bus 502. The communication interface 513 provides a two-way data communication coupling to a network link 514 that is connected to, for example, a local area network (LAN) 515, or to another communications network 516 such as the Internet. For example, the communication interface 513 may be a wired or wireless network interface card to attach to any packet switched (wired or wireless) LAN. As another example, the communication interface 513 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 513 sends and receives electrical, electromagnetic or optical signals that carry digital data streams representing various types of information.

The network link 514 typically provides data communication through one or more networks to other data devices. For example, the network link 514 may provide a connection to another computer through a local area network 515 (e.g., a LAN) or through equipment operated by a service provider, which provides communication services through a communications network 516. The local network 514 and the communications network 516 use, for example, electrical, electromagnetic, or optical signals that carry digital data streams, and the associated physical layer (e.g., CAT 5 cable, coaxial cable, optical fiber, etc.). The signals through the various networks and the signals on the network link 514 and through the communication interface 513, which carry the digital data to and from the computer system 501 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 501 can transmit and receive data, including program code, through the network(s) 515 and 516, the network link 514 and the communication interface 513. Moreover, the network link 514 may provide a connection through a LAN 515 to a mobile device 517 such as a personal digital assistant (PDA), tablet computer, laptop computer, or cellular telephone.

In summary, the techniques presented herein provide for enterprise applications, regardless of their deployment model (e.g., enterprise data center, private cloud, public cloud), to authorize a logged-in user based on the corporate-determined posture of their device. An enterprise administrator may set policies for accessing the application or data within the application based on the device context and posture. These techniques provide redirection-based flows and multiple chains of trust (e.g., between application and device identity server, between agent and device identity server) to provide a cloud service that securely relays the context of the device to the hosted application. Using the techniques presented herein provides a model to obtain device identity after the user assertion is determined, such that the device identity is separated from the user identity. In other words, the user identity and the device identity are verified independently, and the trust model for each verification may be different.

The techniques presented herein separate out the authentication of user identity and device identity. The separate authentication flows (i.e., a user identity authentication flow and a device identity authentication flow) communicate according to the constructs of standard redirect flows from a trusted identity provider. Within the standard redirect flows, the techniques presented herein enable an identity provider to generate and validate the assertion of an authenticated device identity using metadata added by the device.

In one form, a method is provided for a device to obtain access to an application resource from a remote application server based on an authenticated device identifier. The method includes sending a request to access an application resource provided by a remote application server. The device receives a first message from the remote application server. The first message directs the device to send a first authentication message to a device identity server requesting an authenticated device identity for the device. The device attaches metadata associated with the device to the first authentication message to generate a second authentication message. The device sends the second authentication message to the device identity server and receives the authenticated device identity in return. The device sends the authenticated device identity to the remote application. The device obtains access to the application resource from the remote application server based on the authenticated device identity.

In another form, an apparatus is provided comprising a network interface unit and a processor coupled to the network interface unit. The network interface unit is configured to sends a request to access an application resource provided by a remote application server. The network interface unit is also configured to receive, from the remote application server, a message directing the apparatus to send a first authentication message to a device identify server. The first authentication message requests an authenticated device identity for the apparatus. The network interface unit is further configured to send a second authentication message to the device identity server, receive the authenticated device identity from the device identity server, and send the authenticated device identity to the remote application server. The processor is configured to attach metadata associated with the apparatus to the first authentication message to generate the second authentication message. The processor is further configured to obtain access to the application resource from the remote application server via the network interface unit based on the authenticated device identity.

In a further form, a non-transitory computer readable storage media is provided that is encoded with instructions that, when executed by a processor in a computing device, cause the processor to obtain access to an application resource from a remote application server based on an authenticated device identifier. The instructions cause the processor to send a request to access the application resource provided by a remote application server. The instructions also cause the processor to receive, from the remote application server, a first message directing the computing device to send a first authentication message to a device identity server. The first authentication message requests an authenticated device identity for the computing device. The instructions further cause the processor to attach metadata associated with the computing device to the first authentication message to generate a second authentication message and send the second authentication message to the device identity server. The instructions cause the processor to receive the authenticated device identity from the device identity server and send the authenticated device identity to the remote application server. The instructions also cause the processor to obtain access to the application resource from the remote application server based on the authenticated device identity.

The above description is intended by way of example only. The present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Although the techniques are illustrated and described herein as embodied in one or more specific examples, it is nevertheless not intended to be limited to the details shown, since various modifications and structural changes may be made within the scope and range of equivalents of this disclosure.

What is claimed is:

1. A method comprising:
    at a device, sending a request to access an application resource provided by a remote application server;
    receiving at the device, from the remote application server, a first message directing the device to send a first authentication message to a device identity server, wherein the first authentication message requests an authenticated device identity for the device;
    attaching metadata associated with the device to the first authentication message to generate a second authentication message;
    sending the second authentication message from the device to the device identity server;
    receiving the authenticated device identity from the device identity server, wherein the authenticated device identity is valid for any user identity;
    sending the authenticated device identity to the remote application server; and
    obtaining access to the application resource from the remote application server based on the authenticated device identity.

2. The method of claim 1, wherein a first trust relationship secures communications between the device and the remote application server, and a second trust relationship secures communications between the device and the device identity server.

3. The method of claim 2, wherein attaching the metadata comprises intercepting the first authentication message secured by the first trust relationship and generating the second authentication message, and wherein sending the second authentication message comprises sending the second authentication message to the device identity server secured by the second trust relationship.

4. The method of claim 3, wherein intercepting comprises an agent in a kernel space of an operating system of the device intercepting the first authentication message.

5. The method of claim 2, wherein the first trust relationship comprises a Secure Sockets Layer (SSL) tunnel between the device and the remote application server, and wherein the second trust relationship comprises an SSL tunnel between the device and the device identity server.

6. The method of claim 1, wherein the authenticated device identity is based on a device posture of the device, the device posture determined by a device context server.

7. The method of claim 6, further comprising the remote application server confirming the device posture of the device before allowing access to the application resource.

8. The method of claim 1, further comprising:
    receiving, from the remote application server, a second message directing the device to send a third authentication message to a user identity server, wherein the third authentication message requests an authenticated user identity for a user of the device;
    sending the third authentication message to the user identity server with login information of the user;
    receiving the authenticated user identity from the user identity server; and
    sending the authenticated user identity to the remote application server.

9. An apparatus comprising:
    a network interface unit configured to:
        send a request to access an application resource provided by a remote application server;
        receive at the apparatus, from the remote application server, a message directing the apparatus to send a first authentication message to a device identity server, wherein the first authentication message requests an authenticated device identity for the apparatus;
        send a second authentication message to the device identity server;
        receive the authenticated device identity from the device identity server, wherein the authenticated device identity is valid for any user identity; and
        send the authenticated device identity from the apparatus to the remote application server; and
    a processor coupled to the network interface unit and configured to:
        attach metadata associated with the apparatus to the first authentication message to generate the second authentication message; and
        obtain access to the application resource from the remote application server via the network interface unit based on the authenticated device identity.

10. The apparatus of claim 9, wherein the network interface unit secures communications between the apparatus and the remote application server with a first trust relationship, and the network interface unit secures communications between the apparatus and the device identity server a second trust relationship.

11. The apparatus of claim 10, wherein the processor is configured to attach the metadata by intercepting the first authentication message secured by the first trust relationship and generating the second authentication message, and wherein the network interface unit is configured to send the second authentication message by sending the second authentication message to the device identity server secured by the second trust relationship.

12. The apparatus of claim 10, wherein the first trust relationship comprises a Secure Sockets Layer (SSL) tunnel between the apparatus and the remote application server, and wherein the second trust relationship comprises an SSL tunnel between the apparatus and the device identity server.

13. The apparatus of claim 9, wherein the authenticated device identity is based on a device posture of the apparatus, the device posture determined by a device context server.

14. The apparatus of claim 13, wherein the remote application server confirms the device posture of the apparatus before allowing access to the application resource.

15. One or more non-transitory computer readable storage media encoded with computer executable instructions operable to cause a processor in a computing device to:
  send a request to access an application resource provided by a remote application server;
  receive at the computing device, from the remote application server, a first message directing the computing device to send a first authentication message to a device identity server, wherein the first authentication message requests an authenticated device identity for the computing device;
  attach metadata associated with the computing device to the first authentication message to generate a second authentication message;
  send the second authentication message from the computing device to the device identity server;
  receive the authenticated device identity from the device identity server, wherein the authenticated device identity is valid for any user identity;
  send the authenticated device identity to the remote application server; and
  obtain access to the application resource from the remote application server based on the authenticated device identity.

16. The non-transitory computer readable storage media of claim 15, further comprising instructions operable to cause the processor to secure communications between the computing device and the remote application server with a first trust relationship, and to secure communications between the computing device and the device identity server with a second trust relationship.

17. The non-transitory computer readable storage media of claim 16, further comprising instructions operable to cause the processor to attach the metadata by intercepting the first authentication message secured by the first trust relationship and generating the second authentication message, and further comprising instructions operable to cause the processor to send the second authentication message by sending the second authentication message to the device identity server secured by the second trust relationship.

18. The non-transitory computer readable storage media of claim 17, further comprising instructions operable to cause the processor to execute an agent in a kernel space of an operating system of the computing device to intercept the first authentication message.

19. The non-transitory computer readable storage media of claim 16, wherein the first trust relationship comprises a Secure Sockets Layer (SSL) tunnel between the computing device and the remote application server, and wherein the second trust relationship comprises an SSL tunnel between the computing device and the device identity server.

20. The non-transitory computer readable storage media of claim 16, wherein the authenticated device identity is based on a device posture of the computing device, the device posture determined by a device context server.

* * * * *